(No Model.)
C. HATCH, Jr.
NAIL.
No. 570,633.
Patented Nov. 3, 1896.
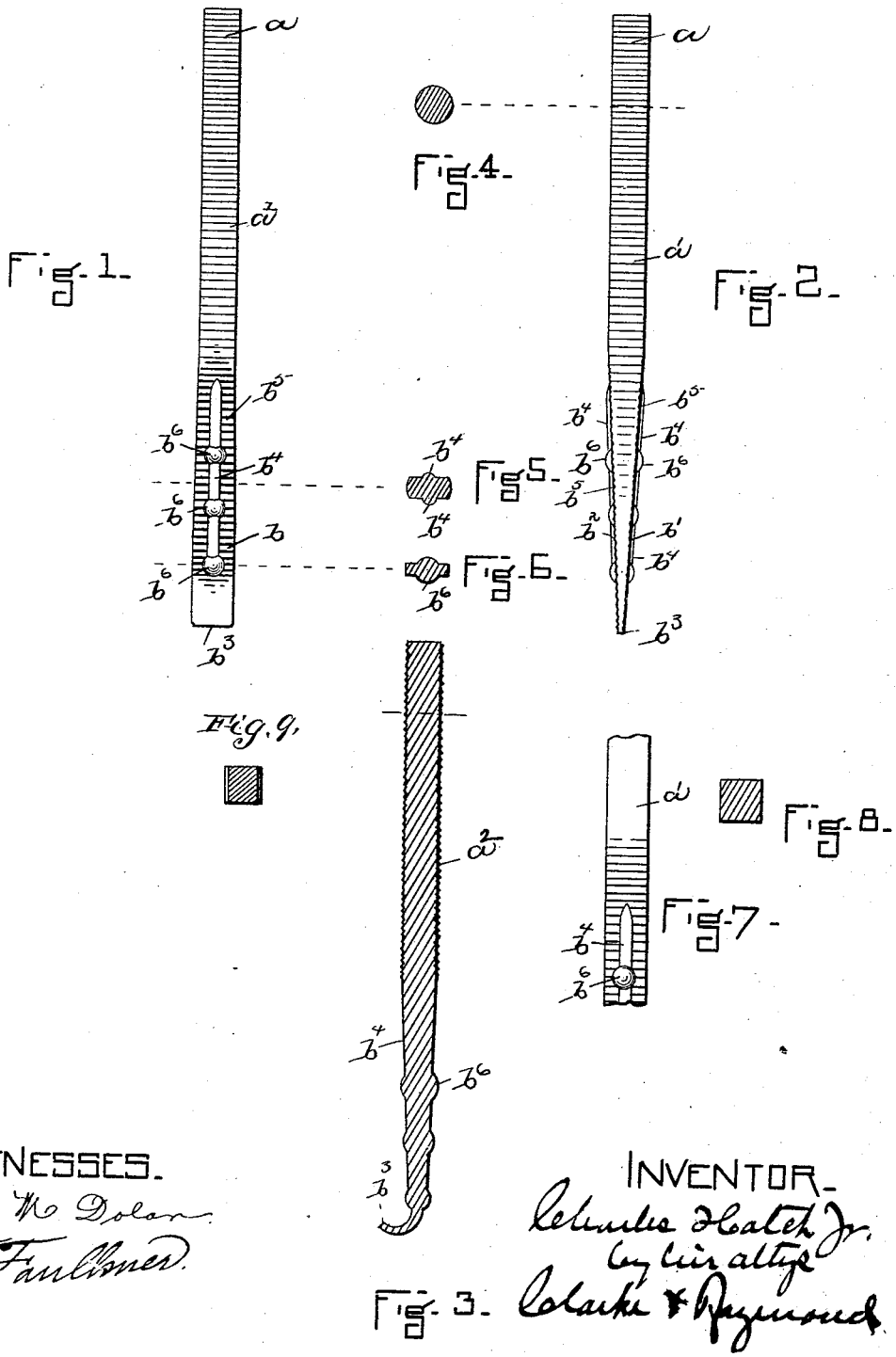
WITNESSES.
J. M. Dolan
F. Faulkner
INVENTOR
Charles Hatch Jr.
by his atty
Clarke & Raymond
THE NORRIS PETERS CO., PHOTO-LITHO., WASHINGTON, D.C.

UNITED STATES PATENT OFFICE.

CHARLES HATCH, JR., OF REVERE, MASSACHUSETTS, ASSIGNOR, BY MESNE ASSIGNMENTS, TO JAMES W. BROOKS, OF PETERSHAM, AND JOHN BROOKS, OF CAMBRIDGE, MASSACHUSETTS, TRUSTEES.

NAIL.

SPECIFICATION forming part of Letters Patent No. 570,633, dated November 3, 1896.

Application filed January 13, 1890. Serial No. 336,749. (No model.)

*To all whom it may concern:*

Be it known that I, CHARLES HATCH, Jr., a citizen of the United States, residing at Revere, in the county of Suffolk and State of Massachusetts, have invented a new and useful Improvement in Nails, of which the following is a full, clear, and exact description, reference being had to the accompanying drawings, forming a part of this specification, in explaining its nature.

The invention relates to a nail preferably made from wire, and specially adapted for use as a heel and sole fastening, having a section of about the gage of the wire or stock from which it is made which constitutes the shank, and which may or may not be corrugated or otherwise roughened, and a rolled or drawn point, preferably of two wide tapering surfaces, and a projection or rib upon one or both tapering surfaces extending very nearly to the point. The rib or ribs act to reinforce the point to within a given distance of the end of the point, where they abruptly end, leaving the point thin and unsupported and thus developing a line or place at which the point will turn to clench.

The invention further relates to a nail of this character having corrugations extending across the drawn surfaces.

In the drawings, Figure 1 is a view in elevation of my improved nail. Fig. 2 is a view in elevation when turned a quarter from the position shown in Fig. 1 thereof. Fig. 3 is a view in vertical central section, illustrating the clenching-point as turned. Fig. 4 is a cross-section upon the dotted line of Fig. 2. Fig. 5 is a cross-section upon the upper dotted line of Fig. 2. Fig. 6 is a cross-section upon the lower dotted line of Fig. 1. Fig. 7 is a detail view to illustrate a nail having the features of my invention made from square wire. Fig. 8 is a view in section taken through the nail of Fig. 7, and Fig. 9 is a cross-section of Fig. 3.

As a rule I prefer to make the nail of wire, although it is not essential that wire be used, as nail-blanks cut from plates or otherwise obtained may be employed. In the drawings I have illustrated the nail as made from wire, and $a$ represents the wire-nail stock. $a'$ represents the shank of the nail. It preferably is of the gage of the wire-nail stock $a$, although it may be somewhat larger or somewhat smaller than that. It also preferably is provided with a corrugated or otherwise roughened surface $a^2$. It may be made from round wire or from square wire or from wire of other section. When made of round wire, it is preferable that the corrugations or roughened surfaces be practically continuous about the shank. When made of square wire, the roughened or corrugated sections may be upon two surfaces only, preferably the opposing surfaces.

$b$ is the point-section of the nail. It is formed by swaging, drawing, or rolling, preferably by rolling in suitable dies. It preferably has the two tapering surfaces $b'$ $b^2$ of practically the full width of the shank from the shank to the end $b^3$ of the point. I do not confine myself, however, to this particular shape of rolled, drawn, or swaged point. Upon the point there is also formed the reinforcing beads or ribs $b^4$ upon one or both sides thereof. These ribs or beads extend to within a short distance of the point, and they serve to stiffen the point to such an extent as to cause the point when its extreme end comes in contact with a metal anvil or turning surface, like a metal last, to turn to form a clenching end, while the remainder of the point is rigid enough to stand up or not turn. I prefer to use two ribs, but one only may be employed for this purpose. I also prefer to extend across the surfaces $b'$ $b^2$ corrugations $b^5$. (See Fig. 1.) This provides the point with a holding-surface, and it also is of use in the rolling of the points, because it enables the dies to obtain a better hold upon the metal during their rolling operation upon it. The points may further have slight knobs or projections $b^6$, although these are not essential.

A nail of this character is desirable because it can be made from the stock without waste, because it has great holding power, and because it will drive straight and remain straight and only the extreme point turn in clenching.

I would here say that I consider a nail having a shank round in section and having a corrugated roughened surface and a rolled point as not included in my invention.

Having thus fully described my invention, I claim and desire to secure by Letters Patent of the United States—

1. As an improved article of manufacture, a headless nail having a shank corrugated transversely and an elongated, drawn, swaged or rolled chisel-shaped point with a vertical reinforcing rib or ribs on the point only, to stiffen the same and a clenching extension beyond the end of said rib or ribs, as and for the purpose described.

2. A nail having an elongated drawn or rolled chisel-shaped point, the surfaces of which are corrugated transversely and also provided with a reinforcing-rib, as and for the purpose described.

CHARLES HATCH, JR.

Witnesses:
J. M. DOLAN,
F. FAULKNER.